United States Patent

[11] 3,562,447

[72] Inventors Martinus C. W. Bakhuizen; Leif Branden; Erling Tronslien, Tyreso, Sweden

[21] Appl. No. 747,211
[22] Filed July 24, 1968
[45] Patented Feb. 9, 1971
[73] Assignee Telefonaktiebolaget LM Ericsson Stockholm, Sweden a corporation of Sweden
[32] Priority Oct. 6, 1967
[33] Sweden
[31] 13725/67

[54] HOOK SWITCH FOR ONE-PIECE STANDING TELEPHONE
5 Claims, 9 Drawing Figs.

[52] U.S. Cl. .......... 179/167, 179/100
[51] Int. Cl. .......... H04m 1/08
[50] Field of Search .......... 179/167, 100D, 103, 164, 165

[56] References Cited

UNITED STATES PATENTS

| | | | |
|---|---|---|---|
| 2,419,388 | 4/1947 | Blomberg et al. .......... | 179/103 |
| 2,990,456 | 6/1961 | Nise .......... | 179/165X |

*Primary Examiner*—William C. Cooper
*Attorney*—Hane and Baxley

ABSTRACT: A standing one-piece telephone instrument has protruding from the bottom of its base an actuating means extending along substantially the entire peripheral outline of the bottom. This actuating means is operated by the weight of the instrument when the same is placed upon a surface. Linkages coupled to spaced-apart portions of the actuating means operate the ON-OFF switching assembly of the instrument so that the instrument is switched OFF when any part of the actuating means along the length thereof rests on the surface and is switched ON when the instrument is lifted.

INVENTORS
Martinus C. W. Bakhuizen
Leif Braaden
Erling Troslien
BY Hane and Baxley
ATTORNEYS INVENTORS
Martinus C. W. Bakhuizen
Leif Branden
Erling Troslien
BY Hane and Baxley
ATTORNEYS

HOOK SWITCH FOR ONE-PIECE STANDING TELEPHONE

The present invention refers to a hook switch device for telephone instruments of the single body type, i.e. the type also called "standing microtelephone." These instruments have the dial located at the bottom, so that it is accessible only when the instrument is lifted up for use. The actuating member for the hook switch is arranged as a protruding push button in the center of the dial. This push button is actuated when the instrument after completion of a call is placed on a solid base such as a table top or the like. With these instruments it can of course happen, that the actuating member of the hook switch mechanism is not completely pressed into its cutoff position if the support surface is irregular.

The invention is an improvement of the known devices and avoids the mentioned disadvantage. The hook switch device is provided with an actuating means projecting through the bottom plate of the instrument and comprising portions distributed along the periphery of the bottom plate, each portion being mechanically connected to an element for actuating the springs of the hook switch.

The invention will be further described by means of an embodiment with reference to the attached drawing on which:

FIG. 1 shows a telephone instrument of the single body type of a known design;

FIGS. 2—4 show this telephone in bottom view with different arrangements of the actuating means;

Figure 1:
Figure 2:
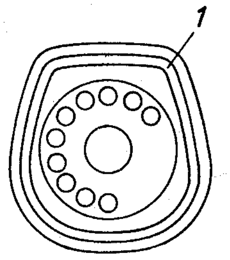
Figure 3:
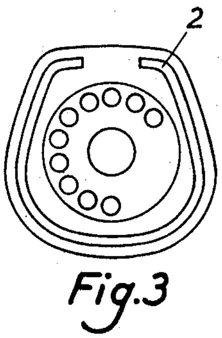
Figure 4:
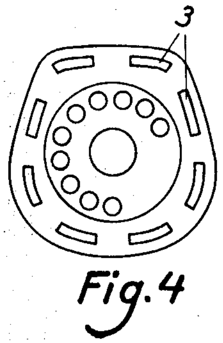
Figure 5:
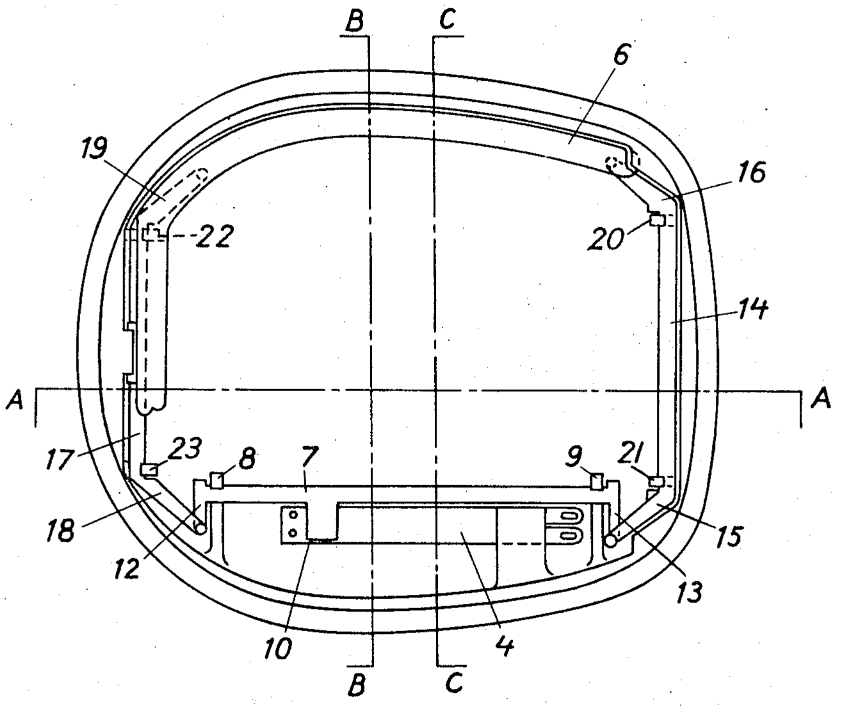
FIG. 5 shows the telephone in bottom view, some of the components not essential for the understanding of the invention being removed to expose the switching device of the invention.

The telephone instrument according to FIG. 1 has a base plate of the form shown in FIGS. 2—4. The actuating means may be in the form of a ring 1 around the periphery of the base plate (FIG. 2). It may also be in the form of a horseshoe 2, (FIG. 3), or it may have a number of projecting members 3 protruding through the base plate and connected to each other on the inside of the base plate (FIG. 4).

Figure 6:
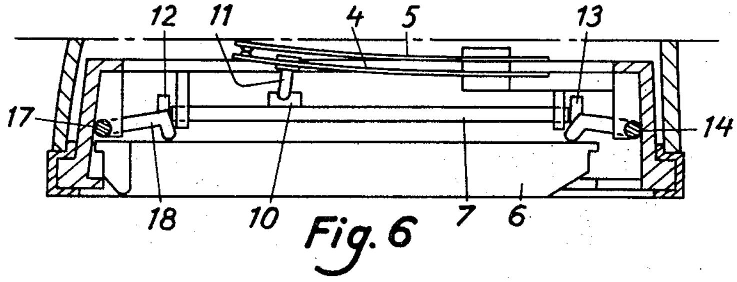
FIGS. 6 and 7 show a section along line A–A in FIG. 5.
Figure 7:
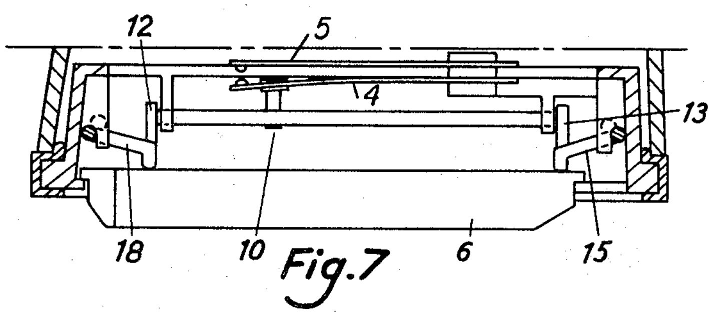
Figure 8:
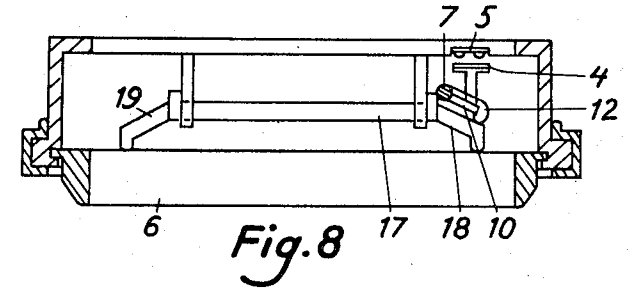
FIGS. 8 and 9 show sections along the lines B–B and C–C respectively in FIG. 5.
Figure 9:
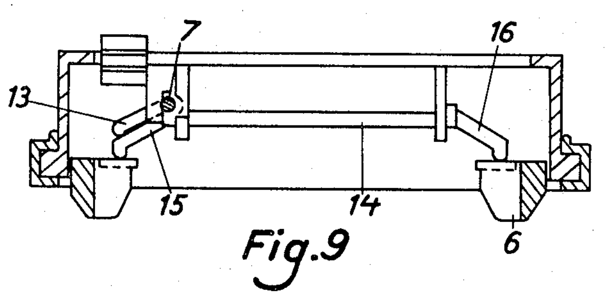

Movement of the actuating means as transmitted to the switch contacts of the instruments as shown in FIGS. 5—9. The actuating means 6 shown in these FIGS. as well as the one indicated in FIG. 3, is of the horseshoe form. The switch contacts are shown as two normally open contact springs 4 and 5 that make contact when actuated. For the sake of simplicity they are shown as the only spring force that actuates the hook mechanism. For transmission of movement from the actuating member 6 to the spring contact group 4, 5 there are provided three rods or bars 7, 14 and 17. The rod 7 is rotatably supported at its end by bearings 8 and 9 and has an actuating arm 10 upon which rests a lifting stud 11 fixed to the spring 5. At the ends, the rod 7 has two crank arms 12 and 13. The rod 14 is also rotatably supported at its end portions by bearings 20 and 21 and mounts crank arms 15 and 16. The crank arm 15 is at its end portion located between the crank arm 13 and the actuating member 6 while the crank arm 16 rests only against the actuating member 6. The rod 17 which is rotatably supported at its end portions, by bearings 22 and 23 is provided with a crank arm 18, the end portion of which is hinged to the crank arm 12 of the rod 7 and the actuating member 6, and with a crank arm 19 which rests against the actuating member 6 only. FIG. 6 shows the actuating member in its pressed-in position and FIG. 7 shows the actuating member in the position it has when the instrument is lifted for communication.

If the instrument after a finished conversation is placed on an irregular surface, the actuation of the actuating member 6 may occur at any one portion of the same. If for instance the actuation occurs at the portion shown in the upper right hand corner of FIG. 5, the actuating member is pressed-in at this portion, whereby the crank arm 16 is actuated. As a result, rod 14 is rotated and by means of the crank arm 15 transmits the movement to the crank arm 13, whereby the rod 7 is turned, so that the arm 10 lifts the contact spring group. The same movement is obtained, if the actuation occurs at the lower right hand corner of FIG. 5 because the crank arm 15 with its end rests against the actuating member and directly transmits the movement to the crank arm 13. In the same manner the spring group is actuated when the actuating member is pressed-in at any portion at the upper or lower part on the left hand side of the FIG., whereby the rod 17 is rotated and its crank arm 18 transmits the rotational movement by means of the crank arm 12 to the rod 7.

We claim:

1. A switching device for switching OFF and ON a standing one-piece telephone instrument having a base portion by respectively placing the base portion of the instrument upon a support surface and lifting it therefrom, said instrument comprising in combination:

actuating means supported by the base portion of the instrument and extending along substantially the length of the peripheral outline thereof, said actuating means being displaceable relative to the base portion from a position protruding from the base portion into a pressed-in position in response to pressure applied to any part of the actuating means by placing the base portion on the support surface;

ON-OFF switch means;

switch-operating means supported by the base portion and movable between an ON position closing the switch means and an OFF position opening the switch means; and linkage means supported by the base portion and operatively coupled to said switch-operating means and peripherally-spaced portions of said actuating means, said linkage means controlling said switch-operating means and being controlled by pressure upon any point of the actuating means, the switch-operating means moving the switch means into the ON position in the absence of pressure upon the actuating means and into the OFF position in response to pressure upon any point of the actuating means.

2. The switching device according to claim 1 wherein said switch-operating means comprise a bar mounting an actuating element, said bar being rotatable into and out of an angular position in which said actuating element holds the switch means in the ON position.

3. The device according to claim 2 wherein said linkage means comprise a crank arm at each end of said first bar, a second bar and a third bar both rotatably mounted on the base portion and each having a crank arm at each end, one crank arm of the second and third bar being coupled to the respective crank arm of the first arm in rotation transmitting engagement and the other crank arms of the second and third bars being in motion-transmitting engagement with lengthwise spaced-apart portions of the actuating means, displacement of any part of the actuating means toward the pressed-in position thereof causing a corresponding rotation of at least one of the second and third bars, rotation of either one of said bars rotating the first bar into the angular position in which the actuating element mounted thereon holds the switch means in the OFF position.

4. The device according to a claim 1 wherein said actuating means comprise an elongate strip conforming to the peripheral outline of said base portion for at least most of the length thereof.

5. The device according to claim 1 wherein bias means bias said actuating means toward the protruding position for moving the same into said position in response to cessation of pressure upon the actuating means, movement of the actuating means into the protruding position causing the switch-operating means to move the switch means into the OFF position via the linkage means.